Jan. 13, 1948.  S. REIBEL  2,434,435
SYSTEM FOR CONVEYING CHIPS OR OTHER LOOSE MATERIAL
Filed Jan. 5, 1945  4 Sheets-Sheet 1

INVENTOR.
Sidney Reibel.
BY
Harness, Dickey & Pierce.
ATTORNEYS.

Jan. 13, 1948.    S. REIBEL    2,434,435
SYSTEM FOR CONVEYING CHIPS OR OTHER LOOSE MATERIAL
Filed Jan. 5, 1945    4 Sheets-Sheet 2

INVENTOR.
Sidney Reibel.
BY
Harness, Dickey & Pierce.
ATTORNEYS.

Jan. 13, 1948. S. REIBEL 2,434,435
SYSTEM FOR CONVEYING CHIPS OR OTHER LOOSE MATERIAL
Filed Jan. 5, 1945 4 Sheets-Sheet 3

INVENTOR.
Sidney Reibel.
BY
Harness, Dickey & Pierce
ATTORNEYS.

Patented Jan. 13, 1948

2,434,435

UNITED STATES PATENT OFFICE 2,434,435

SYSTEM FOR CONVEYING CHIPS OR OTHER LOOSE MATERIAL

Sidney Reibel, Huntington Woods, Mich.

Application January 5, 1945, Serial No. 571,454

16 Claims. (Cl. 302—28)

The invention relates to conveyor systems and it has particular relation to a system for conveying metal chips in manufacturing plants.

In manufacturing plants such, for instance, as plants constructing parts made from aluminum alloys, many tons of chips result from various manufacturing operations and it is essential that these chips be salvaged and used again. Large quantities of chips, therefore, must be transported from various locations and ultimately must be delivered to cars or vehicles which transport the chips to foundries or the like. The problem of conveying the chips is complicated by the fact that different alloys are employed and it is of importance that these alloys not be mixed. It is also of importance that storage places be provided for the chips since it is not always possible or convenient to convey them directly to freight cars or other vehicles.

The present invention generally provides a conveying system for delivering chips quickly to storage places and a means for accommodating chips of different alloys without mixing the alloys. Furthermore this system is subject to remote control which is advantageous due to the fact that loading locations may be at some distance from delivery locations.

One object of the present invention is to provide a conveying system which will enable an operator to load chips at a given location and cause the chips to be delivered to a predetermined storage bin by means of remote control.

Another object of the invention is to provide a system of this character which enables the operator to select any one of a number of storage bins into which the chips may be delivered.

Another object of the invention is to provide a conveying system employing a number of storage bins which may be selectively employed, wherein the system automatically operates to warn the operator in the event the bin becomes full and to stop further movement of chips automatically.

Another object of the invention is to provide a system of delivering chips to any one of a number of storage bins from a remote loading point, wherein the operator at the loading point is at all times advised as to the operation at the discharge point.

Another object of the invention is to provide a means for distributing chips from a distributing location to selective storage bins which may be located variable distances from the distributing location.

Other objects of the invention will become apparent from the following specification, the drawings relating thereto, and from the claims hereinafter set forth.

For a better understanding of the invention, reference may be had to the accompanying drawings, wherein.

Figure 1:
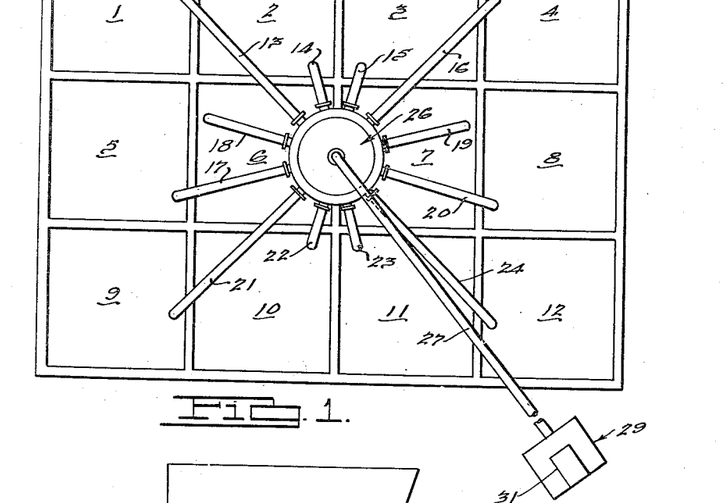
Figure 1 is a general or diagrammatic plan view illustrating the manner in which the chips may be delivered to a series of storage bins in a selective manner.

Referring to Figure 1, the discharge end of the system may comprise a series of storage bins indicated by the numerals 1 to 12, inclusive. Above these bins discharge pipes 13 to 24, inclusive, are provided and these pipes respectively lead to the bins 1 to 12, inclusive. All of the pipes project radially from an annular discharge chamber 26 and, as will be seen presently, a swingable tube 28 or arm in this chamber is adapted selectively to move into communicating relation with the pipes so that chips may be delivered to any one of the bins. While the bins are shown clustered together and the pipes 13 to 24 extending radially, it should be evident that the bins may be located in various places and the pipes may vary widely in length and be directed other than radially.

A conveyor pipe 27 extends over the top of chamber 26 and projects downwardly thereinto at the center of the chamber and this pipe may extend long distances to a loading point or location 29. This loading point is shown diagrammatically at the other end of the pipe and at this loading point a hopper 31 is provided into which the chips may be deposited. Chips delivered to the hopper are blown by gaseous fluid such as air through the pipe 27 and to the swingable tube or arm in the delivery chamber 26 and from that arm to one of the delivery pipes leading to the storage bins.

Figure 2:
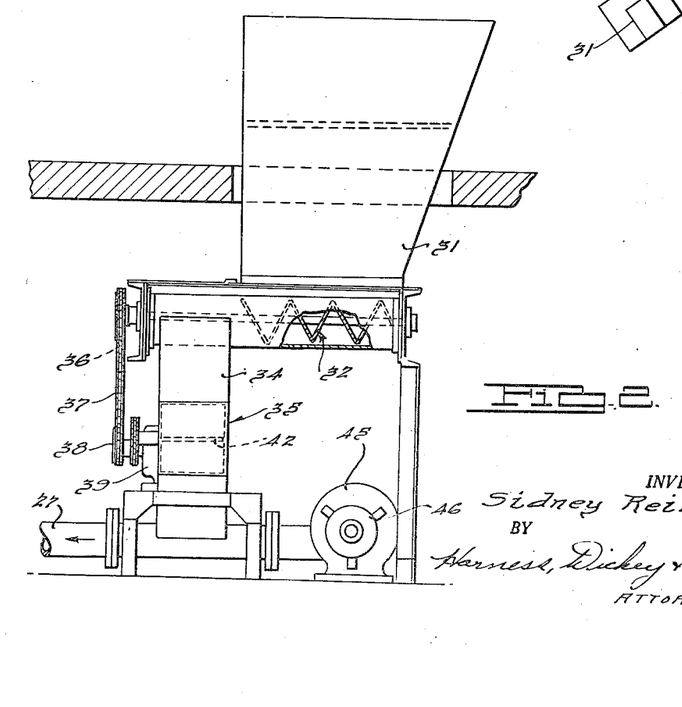
Fig. 2 is a side elevational view illustrating a screw feed and blower apparatus at the loading end of the system for delivering chips to a pipe conveyor leading to the discharge end of the system.
Figures 3, 4:
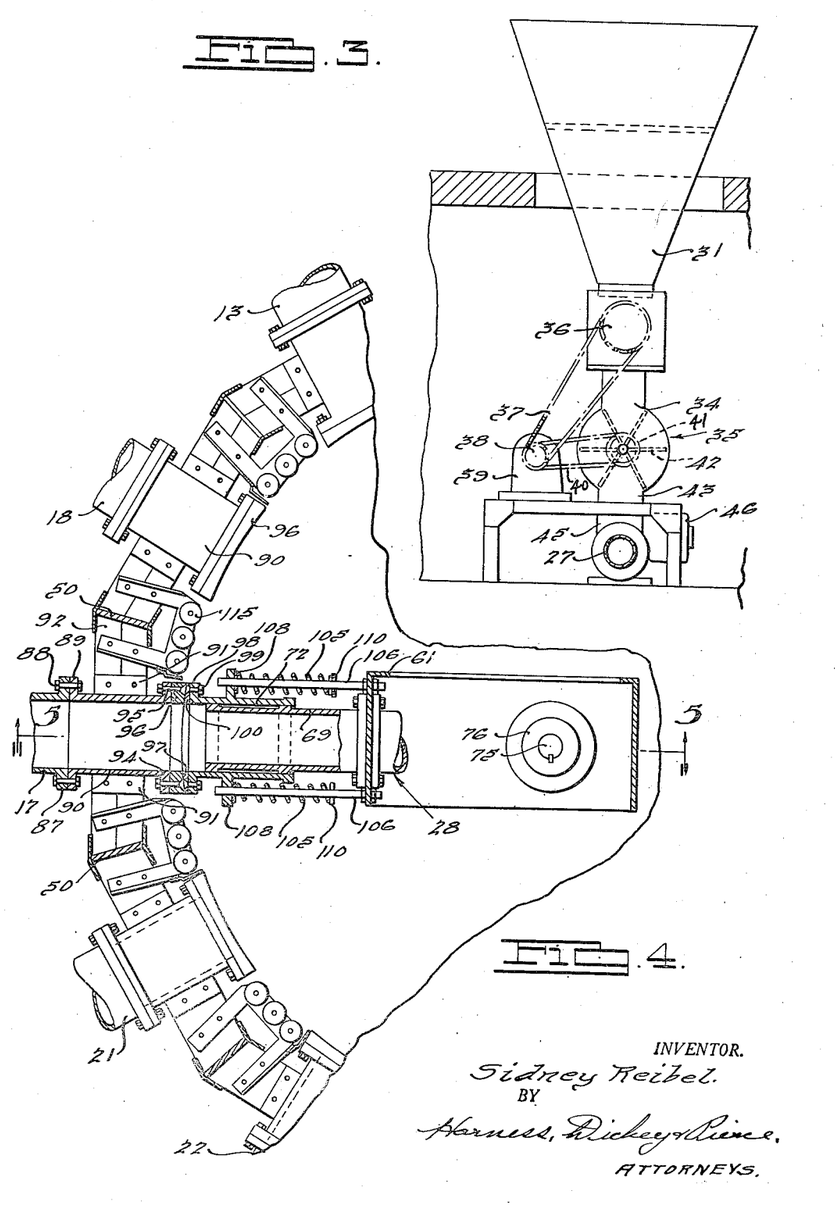
Fig. 3 is an end view of the arrangement shown by Fig. 2.
Fig. 4 is a fragmentary view illustrating a swingable tube at the discharge end of the system for selectively delivering the chips to various pipes leading to the storage bins.

Directing attention particularly to Figures 2 and 3, a screw conveyor 32 is provided beneath the hopper 31 and this screw conveyor extends beyond the hopper and communicates with a vertically disposed discharge pipe 34 connected at its lower end to a rotary feeder 35. The screw in the conveyor is driven by a sprocket 36 which is engaged by a chain 37 and the chain in turn is driven by a sprocket 38 on the shaft of an electric motor 39. The rotary feeder 35 is driven by a second sprocket on the shaft of motor 39, and this sprocket drives a chain 40 engaging a sprocket 41 on the shaft of the feeder. Within the casing of the feeder 35, the shaft carries radial blades 42 and these act to carry the chips around to the lower side of the feeder casing where they drop into a pipe 43 connected to the pipe 27. Within the feeder casing the blades at their outer edges have a sufficiently close wiping contact with the lower end of pipe 34 and upper end of pipe 43 so as to provide an air lock and prevent forced air in pipe 27 from blowing upwardly past the blades while still permitting feeding of the chips to the pipes. A blower 45 is provided at the end of pipe 27 and this blower is driven by an electric motor 46, and it should now be apparent that if chips are deposited in the hopper and the motor 39 is operating to feed the chips to the down pipe 34, the chips will fall into the pipe 27 and the blower will blow the chips through this pipe to the discharge chamber 26.

Figures 5, 6:
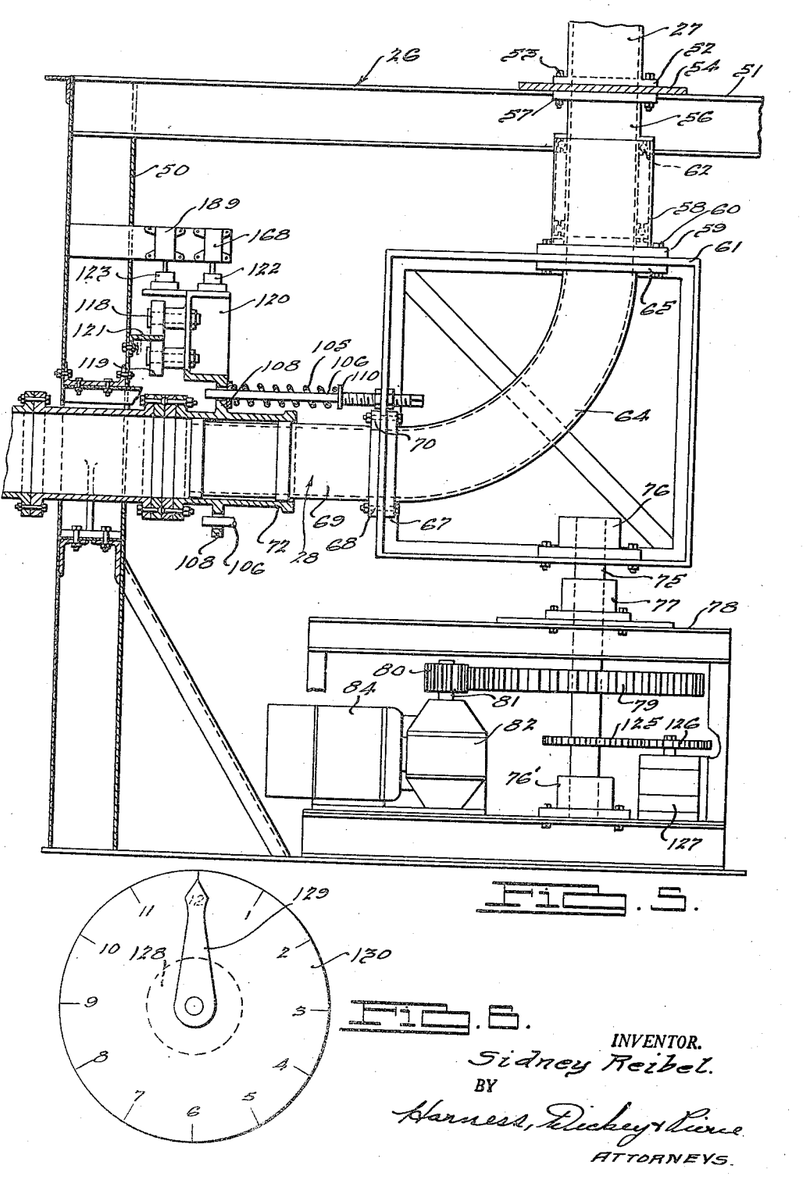
Fig. 5 is a vertical cross-sectional view taken substantially along the line 5—5 of Fig. 4.
Fig. 6 is a rotary dial at the loading end of the system for indicating the position of the swingable tube at the discharge end of the system; and, Fig. 7 is a generally diagrammatic circuit layout illustrating the manner in which the conveying system is operated through electrical control.

Now referring to Fig. 5, the discharge chamber 26 comprises a frame formed by a series of circumferentially spaced uprights 50 and cross frame elements 51 so as to provide generally an annular structure. The pipe 27 at its lower end has a flange 52 which is secured by bolts 53 to an apertured plate 54 mounted on one of the cross frame members 51 forming part of the structure 26 and below this plate, a short vertical pipe section 56 is provided. This section has a flange 57 at its upper end which is connected to the plate 54 by the bolts 53. The lower end of the section 56 projects into a larger pipe section 58 which has a flange 59 on its lower end connected by bolts 60 to a square-shaped frame 61. Ball bearings 62 are provided between the pipe section 56 and the enlarged pipe 58 so that the latter may rotate freely about the former.

Within the frame 61, an elbow-shaped pipe 64 is provided and the upper end of this pipe has a flange 65 which is connected to the frame 61 by the aforementioned bolts 60. The lower end of the pipe 64 has a flange 67 which is connected to a vertical side of the frame 61 by bolts 68. At the outer side of the frame and in alignment with the lower end of the elbow 64, a short pipe section 69 is provided and this section has a flange 70 also secured to the frame by the bolts 68. The outer end of the pipe 69 slidably fits within a tubular or pipe element 72 and this relation of parts is such that the element 72 may be moved inwardly and outwardly on the pipe section 69. From this it follows that the chips coming to the pipe 27 may flow through the pipe 56, elbow 64, pipe section 69 and tubular element 72. It is also evident that the frame 61 may be rotated about the pipe section 56.

The frame 61 is rotated by a shaft 75 which is aligned with the pipe 56 so that the frame rotates about the axis of the pipe. This shaft is keyed to a hub 76 fastened to the frame and is journaled in bearings 76′ and 77 mounted on a sub-framework 78 within the chamber 26 and located at the bottom thereof. Within the sub-structure 78, the shaft 75 is provided with a large gear 79 which meshes with a pinion 80 secured to a shaft 81 on a reduction gearing 82. This reduction gearing is operatively driven by an electric motor 84. From this it follows that the pipes 64, 69 and 72 are carried by a frame which may be driven at a relatively slow speed so as to rotate the element 72 around the interior of the circumferentially arranged posts 50.

Now referring to Fig. 4, the various pipes 13 to 24, inclusive, project radially through the structure 26 between the uprights 50 and jointly constitute a manifold, and each of these pipes has a flanged end 87 connected by bolts 88 to the flanged end 89 of a short pipe section 90 disposed immediately between two of the uprights 50. This pipe section 90 has opposed flanges 91 which are connected to frame members 92 extending between the uprights 50 and it is to be understood that between each pair of uprights, one of the bin pipes is thus connected to a short section 90.

At its inner end, each short section 90 has a flange 94 connected by bolts 95 to a ring 96 having a concave outer face 97. The pipes 90 are in the same horizontal plane as the tubular element 72 and the latter is adapted to be brought successively into coinciding relation with the pipes 90 as the swingable tube 28 is swung about its axis of rotation. The inner end of the tubular element 72 has a flange 98 which is connected by bolts 99 to a second ring 100 and this ring has a convex face adapted substantially to fit the concave faces 97 on the pipes 90 when the tubular element 72 is aligned therewith.

At all times the tubular element 72 is urged toward the end of the pipe section 90 by four springs 105 disposed on rods 106 spaced equally about the element. These rods are fastened to the frame 61 and slidably project through ears 108 on the tubular element 72. The springs around the rods abut at one end the ears and at their other ends fixed collars 110 on the rods respectively. It is evident from this that the tubular element 72 is always urged toward engagement with the end of one of the pipes 90 while at the same time being movable in a reverse direction to permit its movement from one pipe to another.

With particular attention to Fig. 4, it is evident that chips blown through the pipe 69 will move into the pipe section 90 and then into the pipe 17 and finally to the bin marked 5 in Figure 1. If the chips are to be delivered to another bin, for instance, bin No. 6, the swingable tube 28 may be swung by energizing the motor 84 to cause it to move into alignment with pipe 18. In order to facilitate this movement and avoid interference, a series of rollers 115 is provided on the frame structure between the inner ends of each pair of the pipes 90 and these rollers are so located that if the tubular element 72 swings clockwise as seen in Fig. 4, it will move onto the rollers 115 and then freely move over the ring 96 on the next pipe 90. In other words, the rollers project sufficiently with respect to the ring 96 that the ring 100 on tubular element 72 will almost entirely be disposed over the ring 96 on the next pipe 90 before the ring 100 leaves the last roller. The final movement is a sliding movement over the ring 96 until the tubular element has completed its movement.

Figure 7:
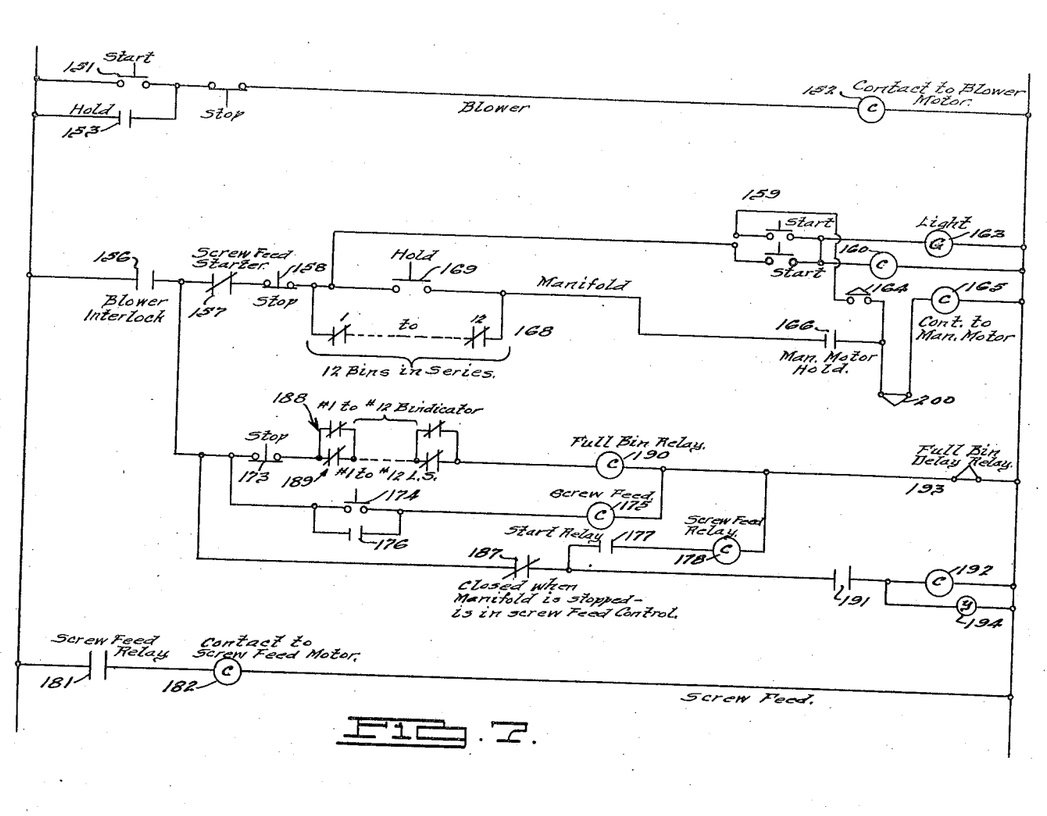

The swingable tube or arm, including the frame 61 and several pipe sections, is also guided accurately in its movement by upper and lower rollers 118 and 119 mounted on a frame 120 secured to the upper ears 108 on the tubular element 72. These rollers embrace a track 121 secured to the uprights 50. It will be noted too that the frame 120 carries cams 122 and 123 which operate a pair of switches which, in order to correspond with Fig. 7, are here indicated at 168 and 189. A pair of these switches is provided at each station or manifold position.

It has been stated heretofore in connection with the present invention that the loading point may be remotely located with respect to the storage bins and delivery manifold, and that the operator at the loading point should have full control of the operation of the system, including operation of the swingable tube. Various controls and functions of the system may best be brought out in connection with a description of the electrical circuit and control devices therein as shown in Fig. 7. Before describing the operation of the circuits and, hence, operation of the system in general, it may be mentioned that the shaft 75, shown in Fig. 5, is provided with a gear 125 which meshes with a gear 126 in a Selsyn indicator motor 127. This motor is electrically connected to a Selsyn indicator motor 128 shown in Fig. 6 and which is located at the loading point and this second motor drives an arm 129 movable over a dial 130. This dial has twelve divisions numbered in accordance with the bins, and the gearing connection is such that when the arm 129 is at the number 1 point on the dial, the manifold arm is in alignment with pipe 13 leading to storage bin No. 1. Therefore, the arm 129 moves in synchronism with the swingable tube and the operator at the loading point knows exactly which bin is operatively connected to the manifold and he knows the position of the swingable tube at all times. This part of the mechanism is not involved in the electrical circuit shown in Fig. 7 since it is only an indicator to show the position of the swingable tube.

Now referring to Fig. 7, the electrical circuit generally includes three subcircuits labeled blower, manifold and screw feed. At all times during use of the system, it is desired to have the blower continue in operation because it will usually be of substantial size. On the other hand, the motor 84 may have to operate more often and this is true of the screw feed motor 39.

When it is desired to start the system, it is only necessary to push button switch 151 and this closes the contact 152 which starts the blower motor. At the same time the holding circuit 153 is closed so that button switch 151 may be released. Closing of the blower contact also closes an interlock contact 156 in the circuit of motor 84 so that the swingable tube can be moved.

With the blower now operating, the operator at the loading point may decide to deliver chips to bin No. 1 and if the swingable tube is at some other position, for instance, No. 8 as indicated on the Selsyn indicator dial 130, it is necessary to move the tube. It might be noted here that an interlock switch 157 is in the circuit of motor 84 and this switch is closed only if the screw feed motor is stopped. Hence, the swingable tube can not be moved if the screw feed motor is running. With switch 157 closed the operator closes one push button switch 159 for an instant and this completes a circuit through a green indicator light 163, and through a time mechanism contact 160 which after a predetermined time closes the time relay 164 for a short period of time. When relay 164 closes, the contact 165 for motor 84 closes and the motor starts.

It will be observed that the manifold circuit includes the series of limit switches 168, one at each of the pipes leading to the respective bins. These switches are in series and all are normally closed but each is opened when the tube 28 reaches its position. Thus with the tube at No. 8, the No. 8 limit switch 168 is open.

When the motor 84 starts, the first movement of the tube 28 will close the No. 8 switch 168 and this completes the holding circuit 166 through the switches 168. The tube will now move to station No. 9 and will then stop as No. 9 switch 168 opens unless the operator holds a hold switch 169 closed which he would in this case until the tube as shown on the Selsyn indicator passed No. 12. Then the tube would stop at the next station due to opening of No. 1 switch 168.

At this time it might be mentioned that the limit switch 189 at each station, shown in the subcircuit below the manifold circuit, is opened when the arm is at that station. These switches are in series but each one is in parallel with a Bindicator switch 188 at the top of its particular storage bin. The Bindicator switch is open when the bin is empty but closes when the bin fills. Hence, for each station the circuit has parallel branches, one including the Bindicator switch 188 and the other the arm operated switch 189. Therefore, with the tube 28 at station No. 1, the switch 189 is open and if bin No. 1 is empty or not full, switch 188 is open.

Assuming the bin empty, the tube 28 is now at the No. 1 station. The operator may now start the screw feed motor by pushing button 174 which closes a circuit through a starting relay coil 175 and a holding contact 176. Coil 175 in turn energizes or closes a normally open contact 177 and in turn this contact closes a screw feed relay 178 which is connected with the screw feed relay 181 in the lower circuit. This closes a magnetic starter 182 for the screw feed motor. It might be observed here that the screw feed circuit includes an interlock 187 which closes only when the motor 84 stops so as to prevent operation of the screw feed motor except when the tube is stopped.

If this bin fills, the No. 1 Bindicator switch 188 opens and this de-energizes a full bin relay 190 and this in turn closes a contact 191. Closing of contact 191 energizes a time mechanism contact 192, and, after a period of time, this mechanism opens a time relay contact 193. This breaks the relay 178 and hence opens the screw feed motor relay 181 to stop the screw feed motor. It may be observed here that a warning light 194 burns upon closing of contact 191 to warn the operator the bin is full and to not add more chips to the hopper. The time delay before contact 193 opens allows the screw feed to empty the hopper and feed before the screw feed motor stops and enough time may be allowed to insure cleaning of all pipes. However, if desired a second time delay may be used which is effective after the screw feed motor stops before the motor 84 can be moved, and this time delay switch mechanism is generally indicated at 200 in the manifold circuit. This time delay mechanism may be operated by the starter contact 182 so that it will open the manifold circuit when the screw feed motor is operating and close it only after a time delay following stopping of the screw feed motor.

The sequence of operations could be effected in the same way at any time by opening contact 173 to open the circuit through the relay 190. In either case the holding circuit 176 is opened when the relay coil 175 is de-energized and the parts are ready for like operations after the manifold is moved.

It has been stated that the tube 28 must move to different stations and be aligned with the discharge pipes. In order to position the tube accurately, the motor 84 may include a brake which automatically operates to stop it quickly when the switch 168 is opened. These controls may be synchronized to stop the tube accurately at each station.

From the foregoing, the operator at the remote loading point can control all operations by the push buttons mentioned. After starting the blower, he can move the tube arm to any station and if at that station the bin is full, the screw feed cannot start and the warning light 194 will burn. If desired a separate light may also be provided on the dial 130 at each station which would be in the Bindicator circuit to show an empty or closed bin so that the tube would be stopped only at an empty bin. With the tube stopped at an empty bin, the button 174 is pushed and the chips will be delivered to the bin. Stoppage of this operation would then depend upon the bin filling or opening of the stop switch 173 and after time intervals, the tube 28 could again be moved to start a new operation.

Although only one form of the invention has been illustrated and described in detail, it will be apparent to those skilled in the art that various modifications may be made without departing from the scope of the claims.

What is claimed is:

1. In a conveyor system, means supporting the ends of a plurality of discharge pipes adapted selectively to deliver material to different discharge points, a discharge tube, means movably supporting the tube so that it may be brought into register with the end of any of the pipes, a telescopic section on the end of the tube for registering with the pipes, and means for automatically and telescopically moving the section on the tube when the latter is moved from one pipe to another so as to bring the section into and out of engagement with the pipes, the last means including stationary elements between the discharge pipes and engageable by the telescopic section as it moves.

2. In a conveyor system, a plurality of discharge pipes, means for supporting the ends of the discharge pipes substantially in the arc of a circle, a tube rotatably mounted to swing substantially about the center of the arc so as to swing an end of the tube along and in the plane of the pipe ends, a pipe section telescopically mounted on the end of the tube and being movable outwardly substantially against the end of each pipe and in register therewith, and means for automatically retracting the section when the tube moves from one discharge pipe to the other, said retracting means including stationary elements engaged by the telescopic section as it moves from one discharge pipe to the other.

3. In a conveyor system, a plurality of discharge pipes, means for supporting the ends of the discharge pipes substantially in the arc of a subcircle, a tube rotatably mounted to swing substantially about the center of the arc so as to swing an end of the tube along and in the plane of the pipe ends, a pipe section telescopically mounted on the end of the tube and being movable outwardly substantially against the end of each pipe and in register therewith, and rollers on the supporting means between each pair of discharge pipes and arranged to engage an end surface on the pipe sections for retracting the pipe section as the tube swings from one discharge pipe to the other.

4. In a conveyor system, a plurality of discharge pipes, means for supporting the ends of the discharge pipes substantially in the arc of a circle, a tube rotatably mounted to swing substantially about the center of the arc so as to swing an end of the tube along and in the plane of the pipe ends, a pipe section telescopically mounted on the end of the tube and being movable outwardly substantially against the end of each pipe and in register therewith, the end of the pipe section and the end of each discharge pipe having complementary convex and concave faces, and means for automatically retracting the pipe section when it is moved from one discharge pipe to another, the last means including stationary elements between the discharge pipes and engageable with surfaces of the telescopic section as it moves.

5. In a conveyor system, a plurality of discharge pipes, means for supporting the ends of the discharge pipes substantially in the arc of a circle, a tube rotatably mounted to swing substantially about the center of the arc so as to swing an end of the tube along and in the plane of the pipe ends, a pipe section telescopically mounted on the end of the tube and being movable outwardly substantially against the end of each pipe and in register therewith, the end of the pipe section and the end of each discharge pipe having complementary convex and concave faces, and means for retracting the pipe section when it is moved from one discharge pipe to another and comprising rollers on the supporting means between each pair of discharge pipes and engageable with the end of the section.

6. In a conveyor system for conveying material particles from a loading location to a delivery location, a movable tube at the delivery location, power operated means for moving the tube so that the material may be discharged at different points, a conveyor pipe connected to the tube and extending to the loading point, fluid moving means connected to the conveyor pipe to blow the particles through the latter and tube, means for feeding the material to the conveyor pipe at the loading point, and means controlling operation of the tube moving means and feeding means so that the tube cannot be moved if the feeding means is in operation.

7. In a conveyor system for conveying material particles from a loading location to a delivery location, a movable tube at the delivery location, power operated means for moving the tube so that the material may be discharged at different points, a conveyor pipe connected to the tube and extending to the loading point, fluid moving means connected to the conveyor pipe to blow the particles through the latter and tube, means for feeding the material to the conveyor pipe at the loading point, and means controlling operation of the tube moving means and feeding means so that the tube cannot be moved until the feeding means is stopped and a predetermined time has elapsed after stopping of the feeding means.

8. In a conveyor system for conveying material particles from a loading location to a delivery location a rotatable tube at the delivery location, a plurality of discharge pipes adapted to selectively be in register with the end of the tube by turning the latter, electric motor means for turning the tube, a conveyor pipe connected to the tube and extending to the loading point, electrically driven means for feeding the material to the conveyor pipe at the loading point, fluid moving means for blowing the material through the conveyor pipe and tube, electrical control means for starting and stopping said motor, electrical control means for starting and stopping the feeding means, electrical time delay means for causing the feeding means to continue operating for a predetermined time after actuating the control for stopping the feeder means, and electrical time delay means for preventing movement of the tube until the feeder means has been stopped for a predetermined interval so as to allow the fluid moving means to clear the pipes before the tube can move.

9. In a conveyor system for conveying material particles from a loading location to a number of selective storage receptacles, a series of discharge pipes respectively leading to the receptacles, a movable tube adapted selectively to be connected to the discharge pipes, a conveyor pipe connected to the tube and leading to a loading location, electrically controlled means for feeding the material to the conveyor pipe at the loading location, fluid moving means for blowing the material through the pipe, electrical control means in the receptacles for stopping the feeding means after a predetermined quantity is conveyed to the receptacle being loaded, time delay means for continuing operation of the feeding means for a predetermined time after the receptacle control means is actuated so as to enable clearing the feeding means, and time control means for preventing movement of the tube until a predetermined time has elapsed after the feeder means stops.

10. In a conveyor system for conveying material particles from a loading location to a delivery location, a movable tube at the delivery location, means for moving the tube so that the material may be discharged at different points, a conveyor pipe connected to the tube and extending to the loading point, fluid moving means connected to the conveyor pipe to blow the particles through the latter and tube, power operated means for feeding the material to the conveyor pipe at the loading point and means controlling operation of the tube and feeding means so that the tube cannot be moved if the feeding means is in operation.

11. In a conveyor system for conveying material particles from a loading location to a delivery location, a movable tube at the delivery location, means for moving the tube so that the material may be discharged at different points, a conveyor pipe connected to the tube and extending to the loading point, fluid moving means connected to the conveyor pipe to blow the particles through the latter and tube, power operated means for feeding the material to the conveyor pipe at the loading point, and means controlling operation of the tube and feeding means so that the tube cannot be moved until the feeding means is stopped and a predetermined time has elapsed after stopping of the feeding means.

12. In a conveyor system for conveying material particles from a loading station to a delivery station, a plurality of discharge pipes, means for supporting the ends of the pipes substantially in the arc of a circle, a tube rotatably mounted to swing substantially about the center of the arc so as to swing an end of the tube along and in the plane of the pipe ends, power means for rotating the tube, a conveyor pipe connected to the tube and extending to the loading point, fluid moving means connected to the conveyor pipe to cause the particles to be blown through the latter and tube, means for feeding the material to the conveyor pipe at the loading point, and means controlling operation of the tube moving means and feeding means so that the tube cannot be moved if the feeding means is in operation.

13. In a conveyor system for conveying material particles from a loading station to a delivery station, a plurality of discharge pipes, means for supporting the ends of the pipes substantially in the arc of a circle, a tube rotatably mounted to swing substantially about the center of the arc so as to swing an end of the tube along and in the plane of the pipe ends, power means for rotating the tube, a conveyor pipe connected to the tube and extending to the loading point, fluid moving means connected to the conveyor pipe to cause the particles to be blown through the latter and tube, means for controlling rotation of the tube rotating means so that it can be turned to and stopped in register with any discharge pipe, means for feeding the material to the conveyor pipe at the loading point, and means controlling operation of the tube rotating means and feeding means so that the tube cannot be moved if the feeding means is in operation.

14. In a conveyor system for conveying material particles from a loading station to a delivery station, a plurality of discharge pipes, means for supporting the ends of the pipes substantially in the arc of a circle, a tube rotatably mounted to swing substantially about the center of the arc so as to swing an end of the tube along and in the plane of the pipe ends, power means for rotating the tube, a conveyor pipe connected to the tube and extending to the loading point, fluid moving means connected to the conveyor pipe to cause the particles to be blown through the latter and tube, means for controlling the tube rotating means so that it can be turned to the next discharge pipe in the direction of rotation and automatically stopped at that pipe, and means modifying the latter controlling means so that the pipe can be moved, without stopping, past any intermediate discharge pipes between the starting point and the pipe at which it is to be stopped and then stopped at the latter pipe.

15. In a conveyor system for conveying material particles from a loading station to a delivery station, a plurality of discharge pipes, means for supporting the ends of the pipes substantially in the arc of a circle, a tube rotatably mounted to swing substantially about the center of the arc so as to swing an end of the tube along and in the plane of the pipe ends, power means for rotating the tube, a conveyor pipe connected to the tube and extending to the loading point, fluid moving means connected to the conveyor pipe to cause the particles to be blown through the latter and tube, means for feeding the material to the conveyor pipe at the loading point, and means controlling operation of the tube moving means and feeding means so that the tube cannot be moved until the feeding means is stopped and a predetermined time has elapsed after stopping of the feeding means.

16. In a conveyor system for conveying material particles from a loading station to a delivery station, a plurality of discharge pipes, means for supporting the ends of the pipes substantially in the arc of a circle, a tube rotatably mounted to swing substantially about the center of the arc so as to swing an end of the tube along and in the plane of the pipe ends, power means for rotating the tube, a conveyor pipe connected to the tube and extending to the loading point, fluid moving means connected to the conveyor pipe to cause the particles to be blown through the latter and tube, and electrical means controlling operation of the power means so that the tube can be moved at will to any discharge pipe and automatically brought to a stop in registry therewith, the power means and tube being of such character that the latter is turnable in one direction through complete revolutions so that the tube can always be advanced in one direction to reach any discharge pipe.

SIDNEY REIBEL.

REFERENCES CITED

The following references are of record in the file of this patent:

UNITED STATES PATENTS

| Number | Name | Date |
|---|---|---|
| 406,446 | Kennedy | July 9, 1889 |
| 721,743 | Richmond | Mar. 3, 1903 |
| 907,848 | Morehouse | Dec. 29, 1908 |
| 1,669,084 | Grindle | May 8, 1928 |
| 1,741,041 | Taylor | Dec. 24, 1929 |
| 1,831,196 | Read | Nov. 10, 1931 |
| 1,857,643 | Kinyon | May 10, 1932 |

FOREIGN PATENTS

| Number | Country | Date |
|---|---|---|
| 478,807 | Great Britain | Jan. 25, 1938 |
| 499,299 | Great Britain | Jan. 20, 1939 |
| 658,003 | Germany | Mar. 18, 1938 |

Certificate of Correction

Patent No. 2,434,435. January 13, 1948.

SIDNEY REIBEL

It is hereby certified that error appears in the printed specification of the above numbered patent requiring correction as follows: Column 12, line 18, list of references cited, under the heading "FOREIGN PATENTS" for     499,299    Great Britain_______________________________Jan. 20, 1939 read

499,297    Great Britain_______________________________Jan. 20, 1939 and that the said Letters Patent should be read with this correction therein that the same may conform to the record of the case in the Patent Office.

Signed and sealed this 4th day of May, A. D. 1948.

[SEAL]

THOMAS F. MURPHY,
*Assistant Commissioner of Patents.*